United States Patent [19]

Ishimura

[11] Patent Number: 4,699,491
[45] Date of Patent: Oct. 13, 1987

[54] CAMERA ACCESSORY WITH ENCODER ADJUSTING DEVICE

[75] Inventor: Toshihiko Ishimura, Habikino, Japan

[73] Assignee: Minolta Camera Kabushiki Kaisha, Osaka, Japan

[21] Appl. No.: 819,862

[22] Filed: Jan. 16, 1986

[30] Foreign Application Priority Data

Jan. 16, 1985 [JP] Japan .................................... 60-6572

[51] Int. Cl.$^4$ ............................................ G03B 17/18
[52] U.S. Cl. .................................. 354/286; 354/289.1
[58] Field of Search ............................. 354/289.1, 286

[56] References Cited

U.S. PATENT DOCUMENTS 4,274,730  6/1981  Taniguchi ......................... 354/289.1
4,477,164  10/1984  Nakai et al. .................. 354/289.1 X Primary Examiner—Michael L. Gellner
Attorney, Agent, or Firm—Price, Gess & Ubell

[57] ABSTRACT

A camera accessory such as an exchangeable lens or an electronic flash device, selectively attached to a camera and having a driven member and an encoder for the driven member. The encoder having a pattern for position adjustment and a brush linked with the driven member, the encoder being constructed to produce code data indicative of the position of the brush on the pattern. The camera accessory outputs a signal indicative of a relationship between the driven member and encoder on the basis of the data from the encoder, the signal being used for the position adjustment.

13 Claims, 7 Drawing Figures

CAMERA ACCESSORY WITH ENCODER ADJUSTING DEVICE

BACKGROUND OF THE INVENTION (a) Field of the Invention

The present invention relates to a camera accessory such as an exchangeable lens or an electronic flash device and, more particularly, to such an accessory selectively attached to a camera and provided with an encoder which generates data representative of the setting position of a driven member of the camera accessory, such as a focusing ring, a focal length adjusting ring and a diaphragm aperture setting ring of the exchangeable lens, and an emitted light angle adjusting mechanism of the electronic flash device.

(b) Description of the Prior Art

Exchangeable lenses are known which are provided with an encoder and a ROM (read only memory) which stores lens data such as the camera-to-object distance to be focused on by the lens (hereinafter referred to as a focused distance), a focal length, and a diaphragm aperture value, etc. that are determined on the basis of the setting position of the above-mentioned driven member. The ROM is accessed by the data of the encoder so that a variety of data relating to the exchangeable lens are sent to the camera from the ROM.

In such an exchangeable lens, the positional relationship between the relative positions of the relatively movable members of the encoder and the set position of the driven member (for example, the focal length adjusting ring), that is, the relative position between an encoder pattern fixed on a lens barrel of the exchangeable lens and a brush linked with the driven section must be accurately adjusted at the time of assembly to produce correct data from the encoder. In this case, if such adjustment is performed with human eyes, high accuracy of the adjustment of the relative position between the encoder pattern and the brush cannot be achieved mainly because the encoder pattern is small in size. Alternatively, if a particular encoder pattern for adjustment is employed to produce an electrical signal, the whole encoder becomes bulky because of the additional provision of the particular pattern. Besides, a jig for the adjustment must be coupled with the lens barrel in the process of assembly, and the jig and its related wires must be removed after the adjustment. The adjusting operation consequently is complicated and time-consuming.

SUMMARY OF THE INVENTION

An object of the invention is, therefore, to provide a camera accessory capable of easily adjusting the relationship between the driven member and the encoder.

Another object of the invention is to provide a camera accessory wherein the adjustment of such relationship is made in a small space and with high accuracy.

According to one aspect of the invention, there is provided a camera accessory selectively attached to a camera and comprising: a driven member; an encoder having a pattern for position adjustment and a brush linked with the driven member, the encoder being constructed to produce code data indicative of the position of the brush on the pattern; and output means for producing a signal indicative of a relationship between the driven member and the encoder on the basis of said data given from said encoder and for outputting the signal to the camera.

Accordingly, a signal indicative of the positional relationship between the encoder and the driven member is produced by the position adjusting patterns provided in the encoder for generating data representing the position of the driven member of the camera accessory of the invention. As a result, the invention can dispense with wires to be connected with the encoder for the adjustment in assembly and the removal of the wires after the adjustment, thereby simplifying and making, a faster adjusting operation. Also, no land for wiring is needed so that the accessory is simple in construction. In addition, since the decision of whether the encoder has been set at the right position or not can be made by the electric signals from the patterns and the brush, the accuracy of the adjustment is greatly improved as compared with the adjustment relying on human eyes. Moreover, because the adjustment patterns and the circuit for reading out the position adjustment information are left on the accessory, the checking of whether the positional relationship of the encoder and the driven member is right or not is carried out after the completion of the accessory assembly without disassembling the accessory.

Other objects and advantages of the invention will become apparent during the following discussion of the accompanying drawings.

BRIEF DESCRIPTION OF THE DRAWINGS

In the drawings, the same reference numerals depict the same structural elements.

DETAILED DESCRIPTION OF THE PREFERRED EMBODIMENT

Figure 1:
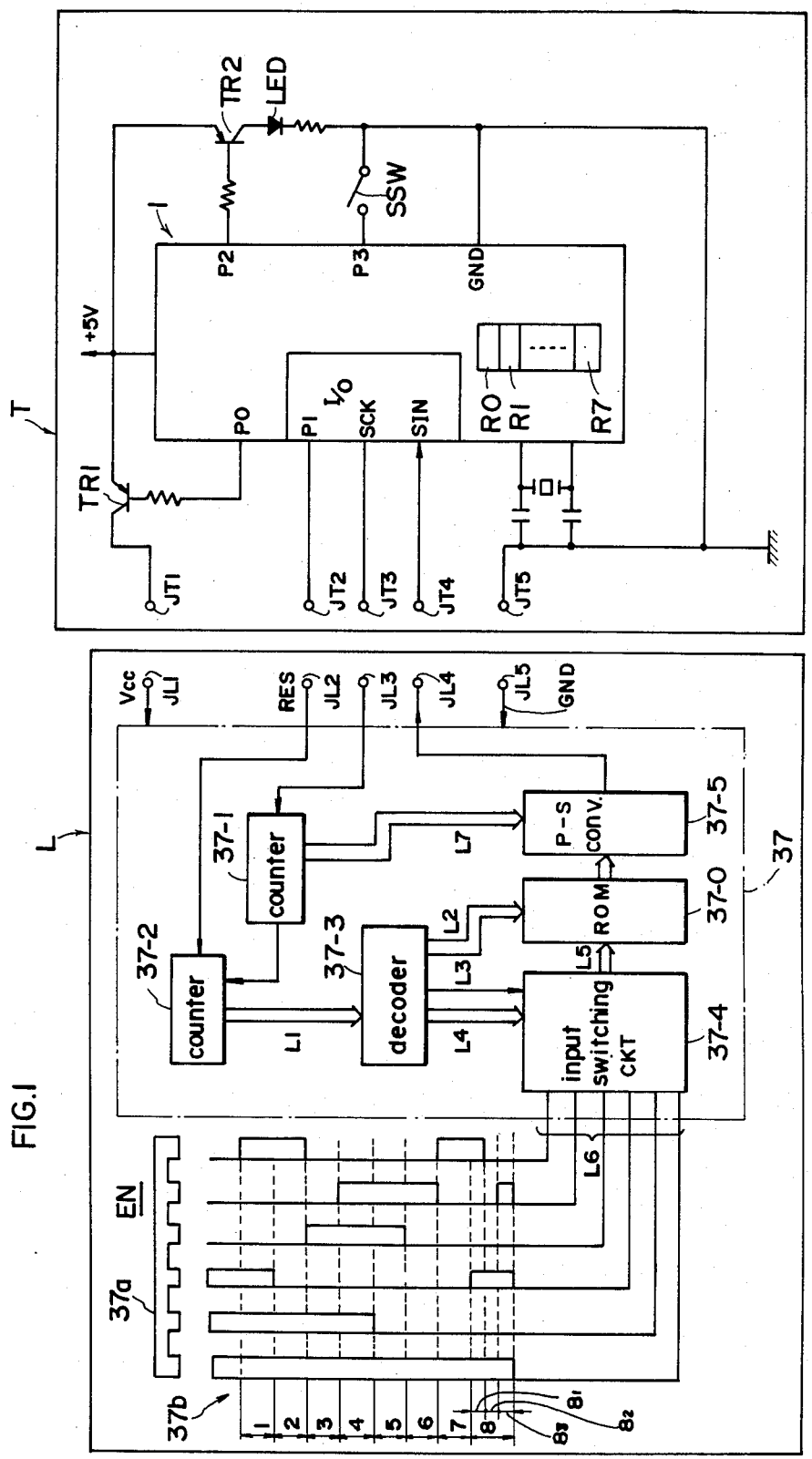
FIG. 1 is a block diagram of one embodiment of the invention.

An embodiment of the invention will be described hereinafter. In the embodiment, the invention is applied to an encoder for a focal length adjusting ring of an exchangeable zoom lens.

The data fixedly stored in a ROM of the exchangeable lens are described first.

The data stored in the ROM includes eight data, i.e., the data of "relevant lens attachment check code", "full open diaphragm aperture value", "maximum diaphragm aperture value", "light measurement error compensation value", "focal length", "conversion coefficient", "full open diaphragm aperture value for AF" and "encoder adjustment information" relating to the invention.

The "relevant lens attachment check code" is first sent to a camera from the lens. When the normal code, for example, "10101010" is read out, a camera body judges that the lens is correctly coupled with the camera body and that the data subsequently read out of the lens are effective. When the normal code is not read out, the ROM data read out subsequently is judged to be invalid.

The F values of the "full open diaphragm aperture value" and "maximum diaphragm aperture value" are converted into AV values using equation $AV = 2 \times \log_2 F\ NO$ with the AV value being expressed by the unit of $\frac{1}{8}$ EV and the converted data is stored in the ROM of the lens. For instance, in the case of F NO=1.68, $AV = 1 + 4/8$, i.e., "0000 1100" is stored. In the case of F NO=32, $AV = 10 + 0/8$, that is, "0101 0000" is stored.

The "light measurement error compensation value" is data for compensating an error in a full-open aperture light measurement and stored in the ROM of the lens with the unit of $\frac{1}{8}$ EV in a manner similar to the "full open diaphragm aperture value" and "maximum diaphragm aperture value".

The "focal length" f is stored in the logarithmically compressed form of $Fl = 8 \times \log_2 (f/6.26)$. For example, in the case of f=50 mm, 100 mm, and 200 mm, Fl=24, i.e., "0001 1000", Fl=32, or "0010 0000", and Fl=40, or "0010 1000" are stored. In other words, the logrithmically compressed value Fl of the focal length f increases by 8 every time the focal length f becomes double.

The "conversion coefficient" is data for converting the defocus amount calculated from the output of the focus detection or distance measurement circuit, into the lens shifting amount necessary to shift the lens to an in-focus position. For actual control of the lens, the coefficient data is given as the ratio of the defocus amount to the number of the output pulses from a detection system for detecting the amount of lens shifting by means of a lens driving AF motor. The conversion coefficient has the unit of pulse/$\mu$m.

The "encoder adjustment information" is data for adjusting the relationship between the encoder for focal length adjustment and the focal length adjusting ring so that the set focal length exactly corresponds to the output of the encoder in the zoom lens.

When the brush linked with the focal length adjusting ring comes to the desired position on the encoder pattern during the adjustment, the ROM produces "0000 0001", whereas it produces "0000 0000" when the brush is not at a desired position.

The structure of the camera system described above will be explained with reference to FIGS. 6 and 7.

When a power supply switch 10 is closed, a CPU (central processing unit) 36 in a camera body B performs its initialization operation and inhibits a release interruption (step $S_0$). If the light measurement switch 11 is closed (step $S_1$), the CPU36 goes to a lens data read-out sequence (step $S_2$). At this step $S_2$, the CPU36 first initiates supply of power Vcc from the camera body B to the lens L through a buffer 43. By changing the level of a reset terminal RES from "Low" to "High", a lens circuit 37 is reset. Upon completion of the reset operation, the CPU 36 starts sending clock pulses CP. A 3-bit binary counter 37-1 gives one pulse to the next 3-bit binary counter 37-2 every eight clock pulses inputted. The counter 37-2 outputs a signal $L_1$ to an address decoder 37-3 depending on the inputted pulses from the counter 37-1.

The input/output relationship of the 3-bit binary counter 37-2 are shown in Table 1.

TABLE 1

| Order of Input Pulses | Output $L_1$ |
|---|---|
| 1 | 000 |
| 2 | 001 |
| 3 | 010 |
| 4 | 011 |
| 5 | 100 |
| 6 | 101 |
| 7 | 110 |
| 8 | 111 |

The address decoder 37-3 produces signals $L_2$ and $L_3$ for address designation of a ROM 37-0 on the basis of the data of the signal $L_1$. The signal $L_2$ is used to designate the upper three bits of 8-bit address of the ROM 37-0, while the signal $L_4$, the lower five bits of the 8-bit address. These lower five bits of each address the ROM 37-0 can also be designated by an external signal $L_6$ from the encoder. The signal $L_6$ generated by a brush 37a and an encoder pattern 37b is a signal corresponding to the focal length set by the focal length adjusting ring. The switching of the signals $L_4$ and $L_6$ is performed by an input switching circuit 37-4 based on the output signal $L_3$ from the address decoder 37-3. The output signal $L_5$ of the circuit 37-4 finally determines the lower five bits of the address of the ROM 37-0.

The input/output relationship of the address decoder 37-3 and the input switching circuit 37-4 are shown in Table 2.

TABLE 2

| $L_1$ | $L_2$ | $L_3$ | $L_4$ | $L_6$ | $L_5$ |
|---|---|---|---|---|---|
| 000 | 000 | 00 | 00000 | $a_4a_3a_2a_1a_0$ | 00000 |
| 001 | 001 | 01 | 00001 | $a_4a_3a_2a_1a_0$ | $a_4a_3a_2a_1a_0$ |
| 010 | 010 | 01 | 00010 | $a_4a_3a_2a_1a_0$ | $a_4a_3a_2a_1a_0$ |
| 011 | 000 | 00 | 00011 | $a_4a_3a_2a_1a_0$ | 00011 |
| 100 | 011 | 01 | 00100 | $a_4a_3a_2a_1a_0$ | $a_4a_3a_2a_1a_0$ |
| 101 | 000 | 00 | 00101 | $a_4a_3a_2a_1a_0$ | 00101 |
| 110 | 000 | 01 | 00110 | $a_4a_3a_2a_1a_0$ | $a_4a_3a_2a_1a_0$ |
| 111 | 100 | 01 | 00111 | $a_4a_3a_2a_1a_0$ | $a_4a_3a_2a_1a_0$ |

Where symbols $a_4$, $a_3$, $a_2$, $a_2$, $a_1$ and $a_0$ represent "0" or "1" which is determined by the encoder pattern 37b.

More specifically, if $L_3$ assumes "00", $L_5$ becomes $L_4$. In the case $L_3 =$ "01", $L_5$ is equal to $L_6$. In this way, the lower five bits of the ROM address can be designated.

Table 3 shows the relationship between the data stored in the ROM and their addresses.

TABLE 3

| $L_1$ | Upper three bits $L_2$ | Lower five bits $L_5$ | Contents of Information |
|---|---|---|---|
| 000 | 000 | 00000 | Attachment check code |
| 001 | 001 | ∅∅∅∅∅ | Full open diaphragm aperture value |
| 010 | 010 | ∅∅∅∅∅ | Maximum diaphragm aperture value |
| 011 | 000 | 00011 | Compensation value |
| 100 | 011 | ∅∅∅∅∅ | Focal length |
| 101 | 000 | 00101 | Full open diaphragm aperture value for AF |
| 110 | 000 | ∅∅∅∅∅ | Conversion coefficient |
| 111 | 100 | ∅∅∅∅∅ | Encoder adjustment information |

Where "∅" represents "0" or "1".

Figure 6:
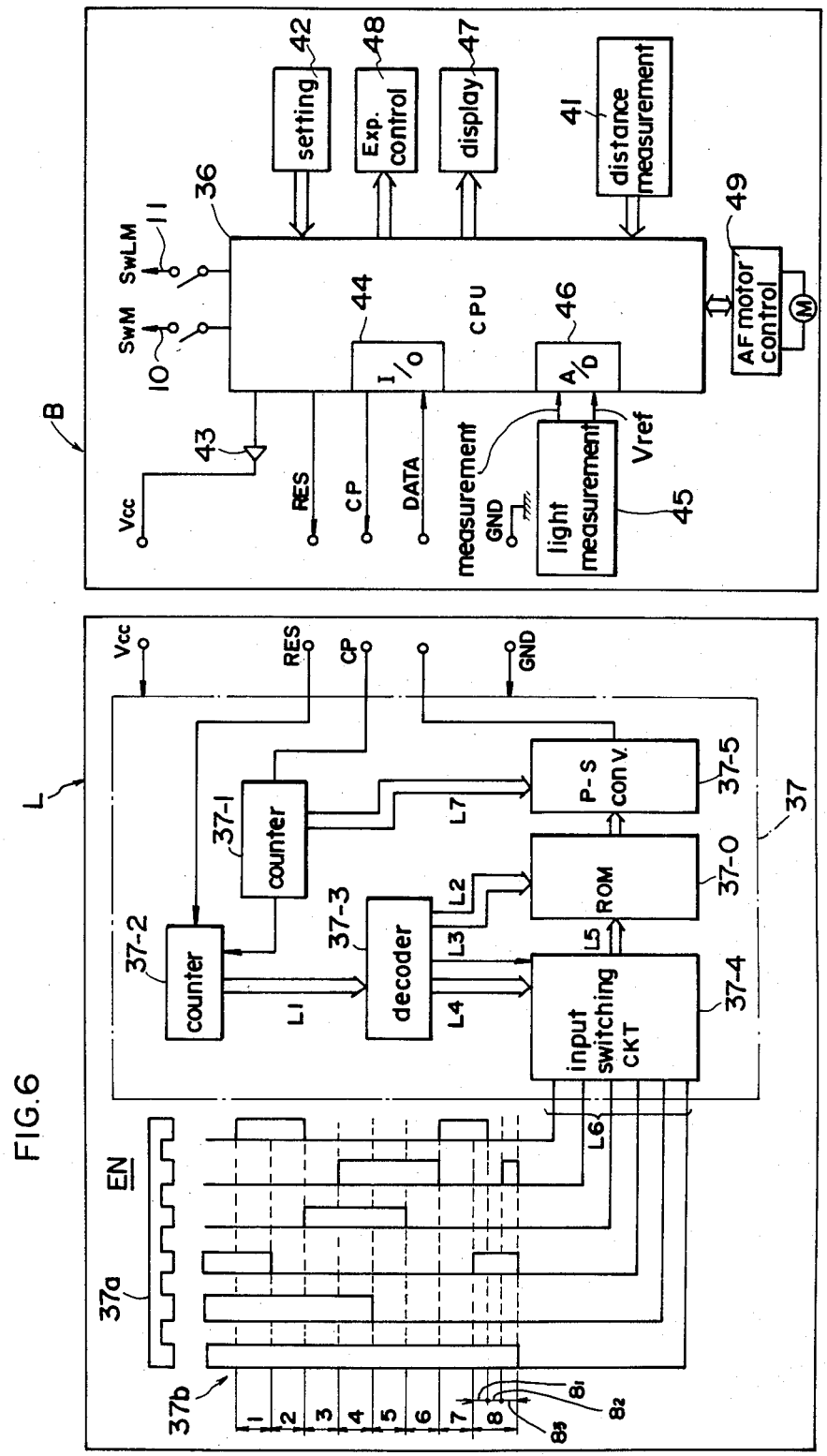
FIG. 6 is a block diagram for showing the relationship between the exchangeable lens and a camera.
Figure 7:
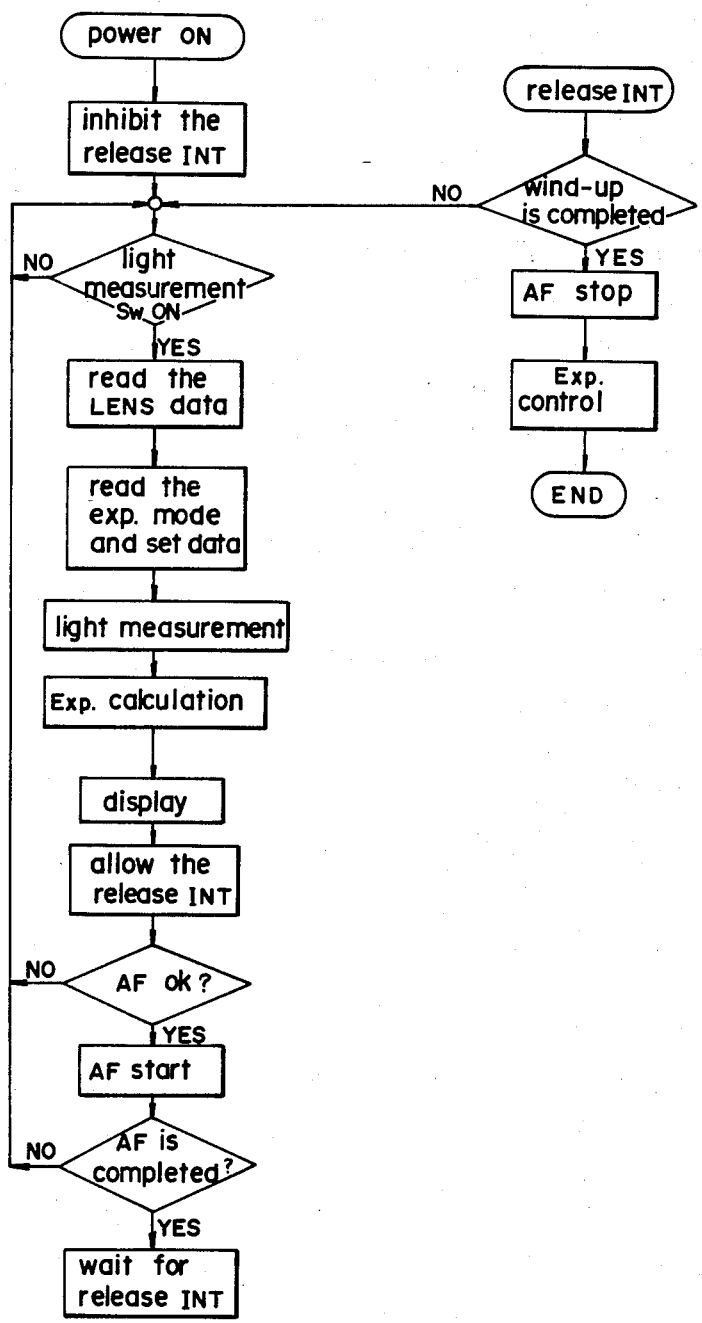
FIG. 7 is a flow chart for showing the operation of various circuits of FIG. 6.

The zoom encoder pattern 37b is divided into patterns 1 to 8 as shown in FIG. 6 depending on the values of the focal length. Each pattern contains data indicative of the ROM address for reading out the focal length or encoder adjusting information. The pattern 8 is further divided into patterns $8_1$, $8_2$ and $8_3$. These patterns $8_1$ to $8_3$ contains data for reading out the zoom encoder adjusting information, which are used for the position adjustment of the zoom encoder described later. The patterns $8_1$ to $8_3$ lie within the divided area of the same focal length. For this reason, although the ROM addresses designated by $L_5$ are different from one another when the brush 37a is on the pattern $8_1$, $8_2$ or $8_3$, the ROM data in those addresses have the same focal length value.

The ROM 37-0 produces 8-bit parallel data stored fixedly at the address, which is designated by $L_2$ and $L_5$, to an 8-bit parallel-to-serial conversion circuit 37-5. The circuit 37-5 converts the 8-bit parallel data given from the ROM 37-0 into 8-bit serial data and outputs converted serial data sequentially, e.g., from the least significant bit. The timing control of the circuit 37-5 is made on the basis of the output signal $L_7$ from the 3-bit binary counter 37-1.

The logical output of the circuit 37-5 is shown in Table 4.

TABLE 4

| $L_7$ | $b_7$ | $b_6$ | $b_5$ | $b_4$ | $b_3$ | $b_2$ | $b_1$ | $b_0$ |
|---|---|---|---|---|---|---|---|---|
| 000 | 0 | 0 | 0 | 0 | 0 | 0 | 0 | 1 |
| 001 | 0 | 0 | 0 | 0 | 0 | 0 | 1 | 0 |
| 010 | 0 | 0 | 0 | 0 | 0 | 1 | 0 | 0 |
| 011 | 0 | 0 | 0 | 0 | 1 | 0 | 0 | 0 |
| 100 | 0 | 0 | 0 | 1 | 0 | 0 | 0 | 0 |
| 101 | 0 | 0 | 1 | 0 | 0 | 0 | 0 | 0 |
| 110 | 0 | 1 | 0 | 0 | 0 | 0 | 0 | 0 |
| 111 | 1 | 0 | 0 | 0 | 0 | 0 | 0 | 0 |

After sending 56 clock pulses CP to the lens, the CPU36 of the camera body B makes the reset terminal RES "High", so that seven data from the ROM of the lens, i.e., seven-byte data from the "relevant lens attachment check code" to the "conversion coefficient" can be read out to a serial I/O portion 44. It should be noted that the encoder adjustment information is not read out, because it is unnecessary for the camera.

After this, an exposure control mode, a diaphragm aperture value or a shutter speed value is then read out from a manually setting member 42 (step $S_3$) and a light measurement is initiated at a light measurement circuit 45 (step 4). A light measurement output and a reference voltage Vref are given to an analog-to-digital (A/D) converting section 46 of the CPU 36 and the light measurement output is converted into digital data. An exposure calculation is made based on the light measurement value, the exposure control mode, the "full open diaphragm aperture value", "maximum diaphragm aperture value", "compensation value" and the like (step $S_5$). The result thus obtained is displayed at a display section 47 and sent to an exposure control section 48 (step $S_6$). At this stage, the inhibition of the interruption of a release operation is cancelled to make the release operation possible (step $S_7$).

Next, the CPU36 performs at step $S_8$ the decision of whether the autofocusing (AF) operation is possible or not.

In the case where the "full open diaphragm aperture value for "AF" of the lens is larger than a predetermined aperture value, the light measurement is repeated with the operation returning again to the above-mentioned routine for reading out the lens data until the coming of the release interruption, instead of starting the AF operation. If the lens has the "full open diaphragm aperture value for AF" less than the predetermined aperture value, the AF operation is started (step $S_9$.) A defocus amount is calculated on the basis of the output of a distance measurement element 41. The "conversion coefficient" is multiplied by the defocus amount to calculate the pulse number required to drive the lens to an in-focus position. The lens driving is then started.

Next, the sequence returns to the lens data reading-out routine again. If the AF operation has been completed, the sequence goes to the stage for waiting for the release interruption (step $S_{11}$). Once the release operation is done, the sequence enters an interruption processing routine, which begins at step $S_{12}$. First, whether the winding-up or shutter charging operation has been completed or not is checked (step $S_{12}$). In response to the detection of the winding-up completion, the AF operation is stopped (step $S_{13}$). The control of the shutter speed and the diaphragm aperture obtained by the exposure calculation is then carried out at the exposure control circuit 48 (step $S_{14}$) and a series of processing is completed. It should be noted that if said winding-up operation has not been completed at step $S_{12}$, the sequence jumps to step $S_1$ to go back to said read-out routine.

Next, an example of position adjustment in this exchangeable zoom lens on the basis of said zoom encoder adjusting information will be described referring to FIGS. 1 to 5.

Figure 2:
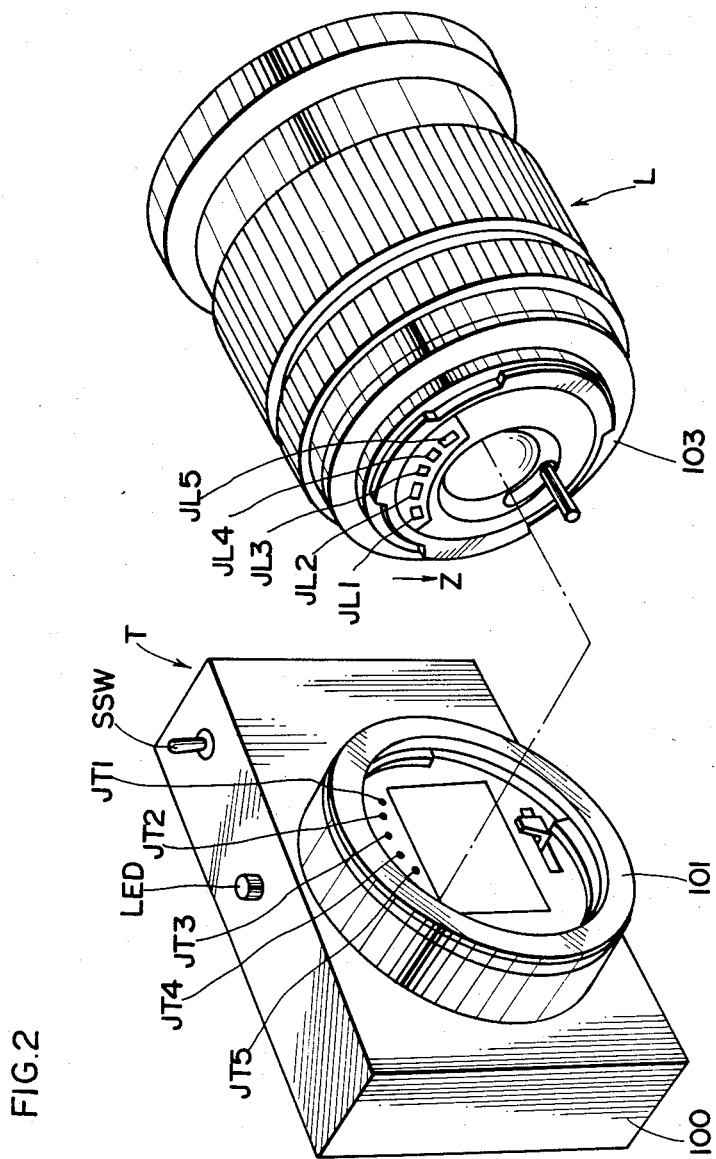
FIG. 2 is a perspective view of an exchangeable lens and an adjusting device.

Referring to FIG. 1, an adjusting device T has a housing 100 with a body mount or lens seat 101 provided on its side as shown in FIG. 2. The mount 101 receives a lens mount 103 of the exchangeable lens L so that terminals JL1 to JL5 on the lens are connected to terminals JT1 to JT5 on the housing 100. The housing 100 is equipped with a light emitting diode (LED) and a start switch SSW. In FIG. 1, the lens circuit 37 of the exchangeable lens L has the same structure as that of the exchangeable lens shown in FIG. 6. The same symbols as shown in FIG. 6 depict the same structural elements.

Figure 3:
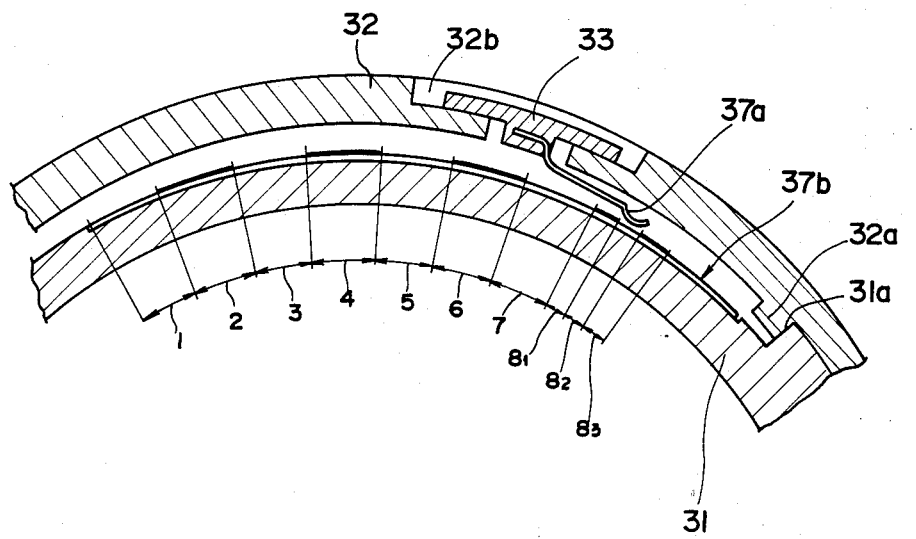
FIGS. 3 and 4 show an encoder used in the embodiment of FIG. 1.
Figure 4:
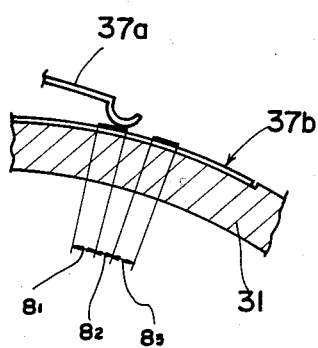
Figure 5:
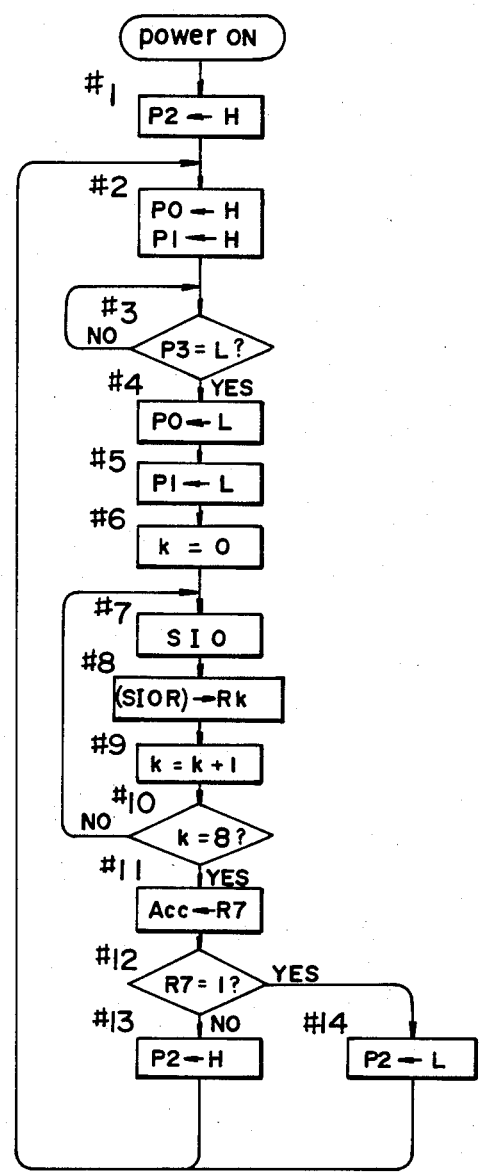
FIG. 5 is a flow chart for showing the operation of the embodiment of FIG. 1.

Referring to FIGS. 3 and 4, the encoder EN comprises the encoder pattern 37b attached over the circumference of a lens barrel 31, and the brush 37a linked with a focal length adjusting ring 32 rotatable around the circumference of the barrel 31. The ring 32 has a brush-holding member 33 attached in a concave portion 32b and the member 33 is bonded to the concave portion 32b after the position adjustment. The brush 37a is integrated molded with the member 33 by insertion. The ring 32 has a projection 32a to limit the zoom rotation at both ends of the adjusting area of the focal length together with a rotation restriction portion 31a of the barrel 31. After the completion of adjustment, a manually operated member such as a rubber ring is attached and bonded to the outer circumerence of focal length adjusting ring 32. In response to the rotation of the ring 32, a desired focal length is achieved with the movement of an optical system (not shown), and the brush 37a also slides over the patterns 1 to 8 of the zoom encoder pattern to produce code data corresponding to the position of the brush 37a on the encoder pattern 37b. The data is used to designate a ROM address. The patterns $8_1$ and $8_3$ for position adjustment are provided at the rightmost position of movable area of the brush 37a in FIG. 3. The pattern $8_2$ is formed between the patterns $8_1$ and $8_3$ to divide the adjustment pattern 8 into three. The encoder EN is constructed in such a manner that when the brush 37a is opposed to the pattern $8_2$, the encoder EN is accurately set on the exchangeable lens.

In advance of attaching the lens L to be adjusted to the adjustment device T, the projection 32a is brought into contact with the rotation restriction portion 31a to set the focal length adjusting ring 32 at the longest focal length setting position, for example, so that the brush-holding member 33 with the brush 37a is set to bring the contact portion of the brush 37a onto the pattern $8_1$, $8_2$ or $8_3$ of the encoder pattern 37b. Accurate adjustment can be achieved with the structure in which the pattern $8_2$ is formed to be slightly larger than the width of the contact portion of the brush 37a.

On the basis of the patterns $8_1$ to $8_3$ of the encoder EN, data 10110, 10111, and 10101 are obtained from the patterns $8_1$, $8_2$, and $8_3$, respectively. Each of these data is used to designate an address of the ROM 37-0 of the lens circuit 37. "0000 0001" is stored in the address of the ROM designated by the pattern $8_2$, whereas "0000 0000" is stored in each of the addresses of the ROM designated by the other patterns 1 to 7 and $8_1$ and $8_3$.

Referring again to FIG. 1, the CPU1 in the adjusting device T includes a microcomputer and is used only for adjusting the relative position between the encoder pattern 37b and the brush 37a and has output ports P0 to P2, an input port P3 and a serial I/O section. In the serial I/O section, ports P1, SCK, and SIN are connected through the terminals JT2, JT3 and JT4 and the JL2, JL3, and JL4 to the 3-bit binary counters 37-1, 37-2 and the 8-bit parallel-to-serial conversion circuit 37-5, respectively.

The output port P0 of the CPU1 is connected to the base electrode of a transistor TR1 with the collector electrode connected to a power supply line of the lens circuit 37 of the exchangeable zoom lens L through the terminals JT1 and JL1. By turning on the transistor TR1, the power supply Vcc is supplied to the lens circuit 37 of the exchangeable lens. The output port P2 is coupled to the base electrode of a transistor TR2 through which the power is supplied to the LED so as to energize the LED when the positional relationship of the brush 37a and the encoder pattern 37b is in a correct relationship.

The start switch SSW which is closed manually at the time of position adjustment is connected to the input port P3. A program for the position adjustment is stored in CPU1 as mentioned in FIG. 5.

It is assumed now that the lens mount 103 of the exchangeable zoom lens L having the encoder to be subjected to the position adjustment is coupled with the body mount 101 of the adjusting device T.

In response to "power-on" of the CPU1, the output port 2 is brought to the "High" level to turn off the transistor TR2 for LED control (step #1). At step #2 the output ports P0 and P1 are then caused to become "High". At this stage the lens circuit 37 does not assume the active state.

In response to the closure of the switch SSW for initiating the adjustment by an operator (step #3), the power supply transistor TR1 is turned on by bringing the output port P0 to the "Low" level (step #4). As a result, the power supply Vcc is supplied to the lens circuit 37. The lens circuit 37 is then brought to the active state by making the output port P1 "Low" (step #5). The content of a resister pointer K is then made to "0" (step #6). The pointer K is employed to designate resisters R0 to R7 for storing data of the lens read through the serial I/O port. With the output port P1 brought to the "Low" level, this signal is fed to the lens circuit 37 via the terminals JT2 and JL2.

Next, the CPU1 performs the serial I/O operation, sequentially reads out data inputted from the lens to a data input port SIN through the terminals JL4 and JT4 synchronizing with the same clock timing as that of the clock produced from a clock output port SCK (step #7), stores the data thus read into a resister RK (step #8), and adds "1" to the resister pointer K (step #9). The CPU1 then judges whether the content of the resister pointer K has reached "8" (step #10). If the content of the pointer K has not reached "8", the CPU1 executes the operation to read-out the next data from the lens by returning to the step #7. In other words, eight data from the lens is stored in the resisters R0, R1 ..., R7 in this order. When the above content of the pointer K is "8", all the data from the exchangeable lens L has been read out into the adjusting device T. Then, the sequence proceeds to step #11. At this time, encoder adjustment information has been written in the resister R7.

In steps #11 and 12, the data stored in the resister R7 is loaded in an accumulator of the CPU1 for the decision of the data.

If the data of the resister R7 assumes "0000 0000", the position relationship between the brush 37a and the encoder pattern 37b is not desirable (see FIG. 4). For this reason, the output port P2 is brought to the "High" level to go back to step #2.

In contrast thereto, if the data of the resister R7 is "0000 0001", the LED is energized by making the output port P2 "Low" and turning on the transistor TR2, since said position relationship is in the desirable one (i.e., the brush 37a comes to the position opposite to the pattern $8_2$) (FIG. 3).

The operator can quickly adjust and confirm the positional relationship between the brush 37a and the encoder pattern 37b through the repetition of the above operation while confirming the lighting of the LED.

Although the adjustment of the encoder for generating focal length information has been described in the foregoing, the present invention is also applicable to an encoder for producing the object distance or diaphragm aperture value, for example.

Also, since the ROM stores various data to be sent to the camera body for the exposure control and the position adjustment data and the address of the ROM is designated by the data from the encoder EN in the above embodiment to obtain the position adjustment data, serial data can be sent to the adjustment device T, dispensing with particular circuits or a jig for the position adjustment.

Further, because the pattern 8 for the position adjustment is divided into the patterns $8_1$ to $8_3$ and because the correct position is selected when the brush is present in the intermediate pattern $8_2$, accurate positioning can be made possible.

The application of the present invention is not limited the exchangeable lens as described above but may be found in various devices. For example, the present invention can also applied to an electronic flash device wherein the position of a light emitting head or panel is to be adjusted to provide a desired cone of emitted light, with the position represented by an encoder for adjusting an emitted light angle or cone.

Although the present invention has been described with reference to the preferred embodiment, it will be appreciated by those skilled in the art that various modifications, substitutions, etc. may be made without departing from the spirit and scope of the invention as defined by the appended claim.

What is claimed is:

1. A camera accessory selectively attached to a camera, said accessory comprising:
    a driven member movable within a given range and having a brush linked thereto;
    an encoder having a plurality of encoder patterns which are selectively in contact with said brush for generating data representing a position of said brush on said encoder patterns, one of said patterns being divided into three portions and used also as the pattern for the position adjustment; and
    an output means, including a read only memory fixedly storing a plurality of data which respectively correspond to a plurality of positions of said driven member, responsive to data indicative of the position of said brush on said patterns, for outputting to said camera data stored in an address of said read only memory designated by the data from said encoder, the output data including data for a photographing operation corresponding to the position of said driven member and data indicative of the positional relationship between said driven member and encoder when said brush comes into contact with the patterns for the position adjustment.

2. A camera accessory as in claim 1, wherein said accessory includes an exchangeable lens.

3. A camera accessory as in claim 2, wherein said lens includes an exchangeable zoom lens and said driven member includes a focal length adjusting ring.

4. A camera accessory as in claim 3, wherein said driven member includes a focusing ring.

5. A camera accessory as in claim 3, wherein said driven member includes a diaphragm aperture setting ring.

6. A camera accessory as in claim 1, wherein said three divided patterns respectively generate different data.

7. A camera accessory as in claim 6, wherein aid three divided patterns are brought into contact with said brush at a different time and each generate different data.

8. A camera accessory as in claim 6, wherein the data for photographing, output from said output means when said brush comes into contact with one of said three divided patterns, is the same data irrespective of the position of said brush on said three divided patterns.

9. A camera accessory as in claim 8, wherein the intermediate pattern of the three patterns are formed to be slightly larger than the width of the contact portion of said brush, and said three patterns are arranged such that correct relationship is selected when the brush is present on the intermediate pattern.

10. A camera accessory as in claim 6, wherein said three divided patterns is provided on the border of movable area of said driven member.

11. An improved camera system having a camera body with a computer circuit for controlling the camera operation and interchangeable lenses comprising:
    a lens housing member;
    an addressable memory means provided with the lens housing member and connected to the camera body when the lens housing member is mounted on the camera body for storing a plurality of information relevant to the lens;
    an encoder pattern member having a plurality of encoder patterns connected to the housing member and positioned to be relatively movable with regard to the encoder patterns to produce output data from the encoder patterns, one of the patterns being divided into three portions;
    means for providing a memory address from the output data and applying it to the memory means, and
    means for transmitting the information stored at the address in the memory means to the camera body, the transmitted information including data for a photographing operation corresponding to each encoder pattern and data for the position adjustment indicative of the positional relationship between the lens housing member and encoder pattern member when the output data represents the patterns divided into three portions.

12. A camera accessory as in claim 11, wherein said output means further includes a parallel-to-serial conversion circuit for converting parallel data from said read only memory into serial data and an output terminal for outputting the serial data.

13. An improved camera system having a camera body with a computer circuit for controlling the camera operation and interchangeable accessories comprising:
    an encoding housing member;
    movable means on the housing member to vary photography operating conditions;
    contact means for providing information of photography operating conditions that have been previously stored in the housing member in correlation with the position of the movable means including a predetermined positioning of the contact means to provide both photography information and positioning information to provide adjustment of the movable means relative to the camera body, and
    circuit means responsive to the positional information to indicate a correct positional relationship.

* * * * *